United States Patent Office 3,642,750
Patented Feb. 15, 1972

3,642,750
ADHESIVES OR SEALING AGENTS WHICH HARDEN ON EXCLUSION OF OXYGEN COMPRISING ESTERS OF ACRYLIC ACIDS AND DICYCLOPENTADIENOLS
Bernd Wegemund, Hilden-Rhineland, and Joachim Galinke, Dusseldorf-Holthausen, Germany, assignors to Henkel & Cie GmbH, Dusseldorf-Holthausen, Germany
No Drawing. Filed Oct. 14, 1968, Ser. No. 767,493
Claims priority, application Germany, Nov. 2, 1967, H 64,338
Int. Cl. C08f 3/42, 15/16
U.S. Cl. 260—89.5
5 Claims

ABSTRACT OF THE DISCLOSURE

The invention relates to adhesive compositions hardenable under exclusion of oxygen comprising liquid esters of acids of the formula

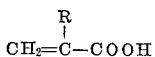

wherein R is a member selected from the group consisting of hydrogen, lower alkyl and halogen, with a cycloaliphatic monohydric alcohol derived from cyclopentadienes selected from the group consisting of dimerized cyclopentadiene and polymerized cyclopentadiene, and an organic percompound selected from the group consisting of organic peroxides and organic hydroperoxides.

THE PRIOR ART

Copending, commonly assigned United States patent application Ser. No. 597,537, filed Nov. 29, 1966, now abandoned, describes and claims adhesives or sealing compositions hardenable under exclusion of oxygen consisting of a content of acrylic acid or methacrylic acid esters of cycloaliphatic alcohols, in which one or two $CH_2$ groups of the cycloaliphatic ring may possibly be replaced by oxygen, and a content of organic peroxides, especially hydroperoxides. These mixtures of methacrylic or acrylic acid esters of the cycloaliphatic alcohols with peroxides make it possible to produce solid bonds between work pieces, but if the hardened joints or sealed places are exposed to relatively high temperatures, the strength of the joint is greatly reduced.

OBJECTS OF THE INVENTION

An object of the present invention is the obtention of an adhesive composition hardenable under exclusion of oxygen which composition on exclusion of oxygen forms an adhesive bond having a high temperature stability.

Another object of the present invention is the obtention of adhesive compositions hardenable under exclusion of oxygen comprising liquid esters of acids of the formula wherein R is a member selected from the group consisting of hydrogen, lower alkyl and halogen, with a cycloaliphatic monohydric alcohol derived from cyclopentadienes selected from the group consisting of dimerized cyclopentadiene and polymerized cyclopentadiene, and an organic percompound selected from the group consisting of organic peroxides and organic hydroperoxides.

A further object of the invention is in the process of forming adhesive bonds between solid material comprising interposing a layer of liquid esters of acids of the formula

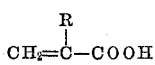

wherein R is a member selected from the group consisting of hydrogen, lower alkyl and halogen, with alcohols, said esters containing from about 0.1% to about 20% of an organic percompound selected from the group consisting of organic peroxides and organic hydroperoxides, between said solid materials and excluding oxygen from said layer, the improvement which consists in utilizing as said ester, an ester with a cycloaliphatic monohydric alcohol derived from cyclopentadienes selected from the group consisting of dimerized cyclopentadiene and polymerized cyclopentadiene.

These and other objects of the invention will become more apparent as the description thereof proceeds.

DESCRIPTION OF THE INVENTION

According to the present invention there is provided an adhesive mixture hardenable under exclusion of oxygen comprising an acrylic acid ester, optionally substituted in the $\alpha$-position, of a cycloaliphatic monohydric alcohol which is derived from dimerized or polymerized cyclopentadiene, and an organic peroxide, especially an organic hydroperoxide.

Acrylic or methacrylic acid esters of 5,6-dihydrodicyclopentadienol-5, or 5,6-dihydrodicyclopentadiene-ol-6 are preferred.

In addition to the preferred methacrylic acid or acrylic acid esters, other $\alpha$-substituted acrylic acid esters of the formula

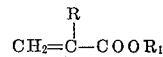

wherein R represents hydrogen, lower alkyl or halogen and $R_1$ represents a cycloaliphatic monohydric alcohol derived from dicyclopentadiene or polymerized cyclopentadiene, such as ethyl or propyl, or chloro or bromo acrylic acid esters may also be used.

The preparation of the, possibly $\alpha$-substituted, acrylic acid esters to be used according to the invention is effected in known way by esterification of the monohydric alcohols derived from dimerized or polymerized cyclopentadiene with the free acids or acid chlorides or by transesterification with, for example, the methyl or ethyl esters of the acids. The monohydric alcohols derived from dimerized or polymerized cyclopentadiene preferably still contain a double bond. It is also possible, however, to use monohydric alcohols in which the double bond has been removed, for example by hydrogenation or adding on halogen or hydrogen halide. The direct addition of the free acrylic acid or $\alpha$-substituted acrylic acid to the dimerized cyclopentadiene is particularly advantageous for the preparation. In this case, only one of the two double bonds present in the dicyclopentadiene reacts. Commercial dimerized cyclopentadiene generally contains also trimers, tetramers and smaller amounts of pentamer fractions. These impurities, however, are not troublesome. Therefore the mixtures according to the invention may also contain esters which are formed from the alcohols derived from oligomeric cyclopentadienes.

Besides the esters of the possibly substituted acrylic acid to be used according to the invention, further polymerizable unsaturated compounds may be added to the mixtures. Such compounds include acrylic acid esters possibly halogenated or alkylated in the $\alpha$-position of the formula

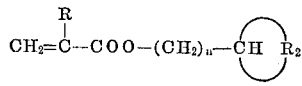

wherein R represent hydrogen, lower alkyl or halogen, $n$ is an integer of from 0 to 1, and R' is a bivalent radical possibly substituted by methyl groups of the formula $-(CH_2)_4-$ or $-(CH_2)_5-$, wherein one or two of the $CH_2$ groups can be substituted by oxygen; if substituted by oxygen, one or two double bonds may also be present. Such compounds include esters with cyclohexanol, methylcyclohexanol, cyclopentanol, methylcyclopentanol, methylolcyclohexane, methylolcyclopentane, tetrahydrofurfuryl alcohol and 1,3-dioxa-2,2-dimethyl-4-methylolcyclopentane. Moreover, minor amounts of esters of methacrylic acid or acrylic acid with other alcohols may be added to the mixtures such as the butyl ester or 2-ethylhexyl ester, either as monomers or as liquid polymerizable polymers such as polybutyl methacrylate. In addition, the mono- or di-esters of, for example, ethylene glycol, diethylene glycol, thio-diethylene glycol, or propylene glycol may be admixed. If desired, esters of maleic, fumaric and itaconic acids with alcohols such as lower alkanols may also be co-employed.

The addition of unsaturated polyesters frequently has a favorable effect on the properties of the adhesives or sealing agents, or the compounds prepared therefrom.

The adhesive compositions of the invention should, however, contain at least 20% of the, possibly α-substituted, acrylic acid esters with cycloaliphatic monohydric alcohols derived from dimerized cyclopentadiene or polymerized cyclopentadiene and preferably at least 60% of these esters in order to obtain the desired high temperature stability of the adhesive bonds produced on hardening.

For the preparation of the mixtures of the invention, organic peroxides or hydroperoxides may be used which are derived from hydrocarbons which contain from about 3 to 18 carbon atoms. For example, suitable organic hydroperoxides are: tertiary butyl hydroperoxide, cumene hydroperoxide, methylethylketone hydroperoxide, diisopropylbenzene hydroperoxide, etc. The organic hydroperoxides should be present in an amount of 0.1% to about 20%, in particular, from 0.5% to 10% based on the total mixture. The mixture may also contain, either alone or in combination with the organic hydroperoxides, those organic peroxides which are half decomposed after 10 hours at temperatures which are higher than 85° C. to 90° C. Suitable organic peroxides include tertiary-butyl perbenzoate, 2,2-bis-(tert.-butylperoxy)-butane, bis-(1 - hydroxy - cyclohexyl)-peroxide, tert.-butylperoxy-isopropyl carbonate, etc. The organic peroxides are utilized in the amounts similar to the organic hydroperoxides.

In addition to the polymerizable esters of acrylic acid or α-substituted acrylic acid with cycloaliphatic monohydric alcohols derived from dimerized cyclopentadiene or polymerized cyclopentadiene, and the organic peroxides or hydroperoxides, the mixtures of the invention, hardenable on exclusion of oxygen, may also contain stabilizing and/or accelerating agents. Suitable stabilizers are, for example, those employed as polymerization inhibitors for polymerizable monomers, such as hydroquinone, quinone, 2,5-di-tert.-butylhydroquinone, N,N'-diphenyl-benzidine, etc. The stabilizers, if added, are added in very small amounts in the order of from 0.001% to 0.1% of the mixture. Suitable accelerators are, for example, aliphatic or aromatic tertiary amines, for example trialkylamines, such as triethylamine, tributylamine, dialkylphenylamines such as dimethylaniline, p-dimethyltoluidine, sulphenamides such as N-diethyl - 2 - benzothiazylsulphenamide or N-methyl-N-cyclohexyl-benzothiazyl-sulphenamide, sulphimides such as benzoic acid sulphimide. The accelerators are generally only added in small quantities of about 0.1 to 5%. Of course, the mixtures of the invention can be free of added stabilizers or accelerators; therefore, the mixtures of the invention can contain from 0 to 0.1% of stabilizers by weight and from 0 to 5% of accelerators by weight.

If the mixtures according to the invention are to be used for the bonding or sealing of glass, plastics or metals catalytically less active, such as zinc, cadmium, steel of high alloy content or electrically anodized aluminium, it is of advantage to treat these materials prior to their utilization with metal salts of accelerating effectiveness, for example, copper or cobalt naphthenate or with polyamines, such as for example, diethylenetriamine, or mercaptans, such as mercaptobenzthiazole, or with substances containing isocyanate groups such as triphenylmethane triisocyanate, or with adducts of trimethylolpropanes and toluylene diisocyanate or adducts of isocyanates and amines, sulphamides, or polyesters. This pretreatment may be effected by dipping, brushing or spraying the parts with a dilute solution of the said compounds. On the other hand, it it not advisable to add such compounds to the mixtures according to the invention at the beginning, as they strongly reduce the storage life of the mixtures.

Thickeners, plasticizers, inorganic fillers and dyestuffs may also be added to the mixtures according to the invention. Suitable thickeners are polymeric compounds such as polymethyl methacrylate, polyethyl acrylate, polystyrene, polyvinyl chloride, synthetic rubber and the like. Suitable fillers are, for example, finely divided silicon dioxide, silicates, bentonites, calcium carbonate or titanium dioxide. The thickeners and/or fillers as well as the plasticizers and dyestuffs may be added in amounts of from 0 to about 40% by weight.

The mixtures according to the invention have an excellent stability against polymerization when exposed to the air or in the presence of small amounts of oxygen. Compared with the mixtures already known from the state of the art, they are distinguished by giving, after setting, a layer of polymerizate with an increased stability to high temperatures.

The adhesives or sealing agents according to the invention find technical application for the fixing screws in their threads, sealing screwed joints, fixing jointed parts or sealing flanges. The adhesive compositions of the invention may particularly be utilized in the bonding or sealing of parts on such machines and apparatuses which operate at high temperatures or which undergo a temperature increase in operation. The co-adhesive compositions of the invention are particularly useful in the automotive and electrical industry as well as in bonding parts in wrapping machines which lay down melted adhesives.

In use, small amounts of the adhesive compositions of the invention hardenable on exclusion of oxygen are applied to the surfaces to be joined together. These surfaces are joined in such a way that air or oxygen is excluded from the joint. After a short period of time, of, for example, from ½ to 3 hours, an adhesive bond is obtained, which bond attains its ultimate strength after about 4 to 48 hours. If so desired, the hardening process can be accelerated by heating the junction.

The following specific embodiments are illustrative of the practice of the invention. It is to be understood, however, that they are not to be deemed limitative in any manner.

The methacrylic or acrylic acid esters used in the following examples are prepared by known processes, by adding methacrylic or acrylic acid on to dimerized cyclopentadiene.

In the case of the compressive shear strength measurements given in the examples, a thrust rate of 50 mm./minute was utilized.

Example I 9.4 gm. of the methacrylic acid ester of 5,6-dihydrodicyclopentadienol (stabilized with 0.06% of hydroquinone) were mixed with 0.5 gm. of a commercial 70% solution of cumene hydroperoxide in cumene and 0.1 gm. of tributylamine. The mixture thus obtained was stable for months at room temperature in a half filled bottle.

Bearing shafts free from rust and grease (steel, 24.95 mm. diameter) were bonded to cylinder rings (chrome steel, 25.00 mm. bore, 10 mm. height) with the mixture obtained.

After storing the samples at room temperature for 40 hours, the compressive shear strength at 23° C. on three samples was found to average 125 kp./cm.²

Test samples of the same kind prepared in the same way were heated to 100° C. and then the compressive shear strength was measured at this temperature. It was 115 kp./cm.²

A number of further test samples were heated to 120° C. for ½ hour after storing at room temperature for 15 hours. A compressive shear strength of 115 kp./cm.² was then measured at 23° C. and also at 100° C.

Example II

Bearing shafts of the same material as described in Example I, but with a diameter of 24.80 mm, were bonded to cylinder rings with a mixture of 8.6 gm. of the methacrylic acid ester of 5,6-dihydro-dicyclopentadienol (stabilized with 0.06‰ of hydroquinone), 0.8 gm. of polybutyl methacrylate, 0.5 gm. of a commercial 70% solution of cumene hydroperoxide in cumene, and 0.1 gm. of tributylamine.

After 65 hours storage at room temperature of the samples, an average compressive shear strength of 110 kp./cm.² was found on testing a portion of these at 25° C.

The remaining samples were heated to 100° C. The compressive shear strength at this temperature was found to average 95 kp./cm.²

Example III 9.5 gm. of the methacrylic acid ester of 5,6-dihydro-dicyclopentadienol (stabilized with 0.06‰ of hydroquinone) were mixed with 0.5 gm. of a commercial 70% solution of cumene hydroperoxide in cumene.

Steel bearing shafts (24.95 mm. diameter) were bonded to cylinder rings of chrome steel (25.00 mm. bore, 10 mm. height) with this mixture.

After storing for 65 hours at room temperature, an average compressive shear strength of 90 kp./cm.² at 25° C. and of 95 kp./cm.² at 100° C. was obtained.

Example IV

A mixture was prepared from 9.4 gm. of the acrylic acid ester of 5,6-dihydro-dicyclopentadienol (stabilized with 0.06‰ of hydroquinone), 0.5 gm. of a commercial 70% solution of cumene hydroperoxide in cumene, and 0.1 gm. of tributylamine. The mixture thus obtained was able to be stored for months at room temperature in a half filled bottle.

Cylinder rings of chrome steel (25.00 mm. bore, 10 mm. height) were bonded on steel bearing shafts (24.95 mm. diameter) with the mixture.

After storing the samples at room temperature for 65 hours, the average compressive shear strength at 25° C. was 140 kp./cm.² and at 100° C. was 110 kp./cm.²

Example V 9.4 gm. of the methacrylic acid ester of 5,6-dihydro-dicyclopentadienol (stabilized with 0.05‰ hydroquinone) were admixed with 0.5 gm. of a commercial mixture of 75% of tert.-butyl hydroperoxide and 25% of di-tert.-butyl peroxide as well as with 0.1 gm. of tributylamine.

With the mixture thus obtained, rust and grease free iron sheets, measuring 20 x 100 mm., were glued together with an overlap of 2 cm.² For this purpose a drop of the above indicated mixture was applied to the joint and the sheets were then joined under a pressure of 0.05 kp./cm.² After two hours, a sturdy adhesive bond between the sheets was obtained.

Similar to Example I, bearing shafts were bonded to cylinder rings with the above indicated mixture. After storing the samples at room temperature for 15 hours and subsequently holding the samples at 120° C. for 30 minutes, the compressive shear strength was found to be 140 kp./cm.² when measured at 25° C. as well as at 100° C.

Example VI 9.4 gm. of the methacrylic acid ester of 5,6-dihydro-dicyclopentadienol (stabilized with 0.06‰ hydroquinone) were admixed with 0.5 gm. of a commercial 50% solution of 2,2 - bis - (tert.-butylperoxy)-butane in dimethyl phthalate, as well as with 0.1 gm. of tributylamine.

As described in Example V, iron sheets were bonded with a drop of the above indicated mixture. A sturdy adhesive bond was obtained after one hour. Similar as in Example I, bearing shafts were bonded to cylinder rings with the above indicated mixture. After storing the samples for 65 hours, the compressive shear strength was found to be 125 kp./cm.² at 100° C.

Example VII

Comparative experiment.—9.4 gm. of the methacrylic acid ester of tetrahydrofurfuryl alcohol (stabilized with 0.06‰ of hydroquinone) were mixed with 0.5 gm. of a commercial 70% solution of cumene hydroperoxide in cumene and 0.1 gm. of tributylamine.

Steel bearing shafts (24.95 mm. diameter) free from rust and grease were bonded to cylinder rings of chrome steel (25.00 mm. bore, 10 mm. height).

After storing the samples at room temperature for 40 hours, an average compressive shear strength of 160 kp./cm.² was measured on a portion of these samples at 23° C.

The remaining samples were heated to 100° C. The average compressive shear strength found at this temperature was 15 kp./cm.²

The preceding specific embodiments are illustrative of the practice of the invention. It is to be understood, however, that other expedient known to those skilled in the art may be employed without departing from the spirit of the invention.

We claim:

1. Adhesive compositions hardenable under exclusion of oxygen consisting essentially of at least 60% by weight of liquid polymerizable esters of acids of the formula

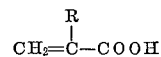

wherein R is a member selected from the group consisting of hydrogen, lower alkyl and halogen, with 5,6-dihydro-dicyclopentadienol, from 0 to 0.1% by weight of stabilizer polymerization inhibitors for polymerizable monomers, from 0 to 5% by weight of accelerators, from 0 to about 40% by weight of thickeners, fillers, plasticizers and dyestuffs, and from 0.1% to about 20% by weight of an organic percompound having from 3 to 18 carbon atoms selected from the group consisting of organic peroxides which are half decomposed after 10 hours at temperatures higher than 90° C. and organic hydroperoxides, and the remainder up to 100% by weight of the composition of other polymerizable unsaturated compounds.

2. The adhesive composition as defined in claim 1 wherein said liquid ester is selected from the group consisting of the acrylic acid ester of 5,6-dihydrodicyclopentadienol and the methacrylic acid ester of 5,6-dihydrodicyclopentadienol.

3. In the process of forming adhesive bonds between solid material comprising interposing a layer containing at least 60% by weight of liquid esters of acids of the formula

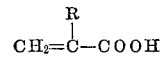

wherein R is a member selected from the group consisting of hydrogen, lower alkyl and halogen, with alcohols, said layer of liquid esters containing from about 0.1% to about 20% of an organic percompound having from 3 to 18 carbon atoms selected from the group consisting of organic peroxides which are half decomposed after 10 hours at temperatures higher than 90° C. and organic hydroperoxides, between said solid materials and excluding oxygen from said layer, the improvement which consists in utilizing as said ester, an ester with 5,6-dihydrodicyclopentadienol.

4. The adhesive composition as defined in claim 1 wherein said organic peroxides are selected from the group consisting of tert.-butyl perbenzoate, 2,2-bis-(tert.-butylperoxy)-butane, bis-(1 - hydroxy - cyclohexyl) - peroxide and tert.-butylperoxy-isopropyl carbonate.

5. The adhesive composition as defined in claim 1, wherein said organic percompound is an organic hydroperoxide.

References Cited
UNITED STATES PATENTS

| | | | |
|---|---|---|---|
| 2,268,611 | 1/1942 | Mitchell | 260—89.5 |
| 2,404,292 | 7/1946 | Hyman | 260—89.5 |
| 2,511,880 | 6/1950 | Rehberg et al. | 260—86.1 |
| 2,830,078 | 4/1958 | Fekete | 260—89.5 |
| 3,218,305 | 11/1965 | Krieble | 260—86.1 |
| 3,225,121 | 12/1965 | Baker | 260—88.3 A |
| 3,256,254 | 6/1966 | Reinhardt | 260—88.3 A |

HARRY WONG, JR., Primary Examiner

U.S. Cl. X.R.

117—124, 132, 138.8; 260—41, 78.5, 80.72, 80.81, 86.1, 884, 885